(12) United States Patent
Nakayama et al.

(10) Patent No.: US 6,246,041 B1
(45) Date of Patent: Jun. 12, 2001

(54) APPARATUS AND METHOD FOR MEASURING FOCUSING CHARACTERISTICS OF OPTICAL PICKUP AND/OR OPTICAL DISC AND APPARATUS AND METHOD FOR RECORDING AND/OR REPRODUCING OPTICAL DISC

(75) Inventors: Akihito Nakayama, UE Square; Kenji Shintani, Singapore, both of (SG); Shunsuke Kohama, Chiba; Yukari Hashimoto, Yokohama, both of (JP)

(73) Assignees: Sony Precision Engineering Center (Singapore) PTE Ltd., Singapore (SG); Disk Ware Co. Ltd., Tokyo (JP)

(*) Notice: Subject to any disclaimer, the term of this patent is extended or adjusted under 35 U.S.C. 154(b) by 0 days.

(21) Appl. No.: 09/182,845

(22) Filed: Oct. 29, 1998

(30) Foreign Application Priority Data

Oct. 31, 1997 (SG) ...................................................... 9703917

(51) Int. Cl.[7] ............................. G02B 27/40; G11B 11/00
(52) U.S. Cl. ...................................... 250/201.5; 369/44.25
(58) Field of Search ..................................... 356/123, 376; 250/201.5; 369/44.25, 94

(56) References Cited

U.S. PATENT DOCUMENTS

| | | | |
|---|---|---|---|
| 5,151,887 | * 9/1992 | Tsutsui et al. | 369/44.25 |
| 5,513,158 | * 4/1996 | Ohsata | 250/201.5 |
| 5,808,983 | * 9/1998 | Tsutsui et al. | 369/44.25 |
| 5,969,365 | * 10/1999 | Takemoto et al. | 250/491.1 |

* cited by examiner

Primary Examiner—Robert H. Kim
Assistant Examiner—Zandra Smith
(74) Attorney, Agent, or Firm—Frommer Lawrence & Haug, LLP.; William S. Frommer; Bruno Polito

(57) ABSTRACT

A device for measuring focusing characteristics of an optical pickup and/or an optical disc capable of measuring characteristics of focusing states with high accuracy by a simplified circuit. An arithmetic-logic unit 12d controls an offset supplying circuit 23 for applying an offset voltage to a focusing servo control signal. This arithmetic-logic unit 12d detects an error rate of the playback data in such a state in which the focusing position of the laser light is deviated by a pre-set offset amount. The arithmetic-logic unit 12d sequentially varies the offset voltage to repeat the above processing for detecting the error rate. The arithmetic-logic unit 12d approximates the relationship of the error rate to the offset amount by a quadratic curve based on detected data. The offset amount which minimizes the error rate is found from this equation of approximation.

20 Claims, 4 Drawing Sheets

APPARATUS AND METHOD FOR MEASURING FOCUSING CHARACTERISTICS OF OPTICAL PICKUP AND/OR OPTICAL DISC AND APPARATUS AND METHOD FOR RECORDING AND/OR REPRODUCING OPTICAL DISC

FIELD OF THE INVENTION

This invention relates to an apparatus and a method for measuring focusing characteristics of an optical pickup and/or an optical disc. The invention also relates to an apparatus and a method for adjusting focusing characteristics of an optical pickup or an optical disc for recording and/or reproducing the optical disc.

DESCRIPTION OF THE RELATED ART

There has so far been known a device for inspecting characteristics of an optical pickup used in an optical disc drive. The device for inspecting characteristics of an optical pickup is used for example for inspection for shipment or reception of an optical pickup in connection with whether or not the optical pickup satisfies the prescribed specifications.

Among inspection items of the device for inspecting characteristics of an optical pickup, there is in general the inspection of so-called defocusing characteristics of the optical pickup.

In a reproducing device for an optical disc, focusing servo is carried out so that the laser light radiated from the optical pickup will produce a minimum-sized spot on a recording track. In an optical disc device, for example, the reflected light from the optical disc is detected by an optical pickup and the reflected light as detected is converted by an photoelectric converting device into electrical signals from which focusing error signals are produced. With the optical disc device, the objective lens of the optical pickup is controlled so that the focusing error signals will be reduced to zero. There are occasions wherein, due to adjustment errors of a semiconductor laser or an objective lens, characteristics thereof or to lack in precision of the photoelectric converting device, the minimum-sized spot of the laser light radiated from the optical pickup is not produced on the recording track of the optical disc even although the focusing error signals are reduced to zero. This error of the optical pickup is termed so-called defocusing. The device for inspecting characteristics of the optical pickup measures the defocusing characteristics of the optical pickup for carrying out shipment or acceptance inspection of the optical pickup.

With a conventional characteristics inspection device of the optical pickup, jitter components of the playback signals of an optical disc are detected for measuring defocusing characteristics of the optical pickup.

However, the conventional characteristics inspection device of the optical pickup necessitates a complicated circuit structure for detecting the jitter components and an extremely costly circuit for detecting data of higher accuracy. Moreover, if the defocusing characteristics are measured in the conventional characteristics inspection device of the optical pickup based on the jitter components, it has been difficult to achieve measurement of characteristics of high accuracy.

SUMMARY OF THE INVENTION

According to the present invention, there is provided an apparatus for measuring focusing characteristics of an optical pickup and/or an optical disc comprising:

focusing servo control means for controlling a focal point position of a laser light beam illuminated on the optical disc, based on an output of a photoelectric converting unit of the optical pickup, for focusing the laser light beam on a recording surface of the optical disc;

reproducing means for reproducing data recorded on the optical disc based on an output of the photoelectric converting unit of the optical pickup;

error rate detection means for detecting an error rate of data reproduced by the reproducing means; and measurement means for imparting a pre-set offset amount to a control amount of the focusing servo control means for varying the focusing position of the laser light, getting from the error rate detection means an error rate of reproduced data when the focusing position of the laser light is varied and for finding the focusing position of the laser light corresponding to the minimum error rate in accordance with an equation of approximation of the error rate corresponding to each focusing position of the laser light.

The measurement means may find the equation of approximation of a quadratic curve for error rates for respective focusing positions of the laser light using an error rate within a pre-set setting range in order to find the focusing position of the laser light corresponding to the least error rate based on this quadratic curve equation of approximation.

The measurement means may set the pre-set setting range which preferably is not higher than an error rate at a focusing position of the laser light enabling focusing servo control and which preferably is not less than an error rate which occurs without dependency on the focusing position of the laser light.

The measurement means may find the quadratic curve equation of approximation of the error rate from data of the error rates in the pre-set setting range from the focusing position with the high error rate to the focusing position directly before or in the vicinity of the error rate first exceeding the lower setting range limit.

The measurement means may impart an offset amount corresponding to the focusing position of the laser light with the least error rate to the control amount of the focusing servo control means for measuring the pre-set characteristic values of the optical pickup and/or the optical disc.

The apparatus for measuring focusing characteristics of an optical pickup and/or an optical disc may further comprise:

adjustment means for adjusting focusing characteristics of the optical pickup based on the focusing position of the laser light corresponding to the least error rate.

According to another aspect of the invention, there is provided a method for measuring focusing characteristics of an optical pickup and/or an optical disc comprising:

controlling the focusing position of the laser light illuminated on the optical disc based on an output of a photoelectric converting unit of the optical pickup for focusing the laser light on the recording surface of the optical disc;

reproducing data recorded on the optical disc based on an output of the photoelectric converting unit of the optical pickup;

detecting an error rate of the reproduced data;

imparting a pre-set offset amount to a control amount of the focusing servo control for varying the focusing position of the laser light;

finding an equation of approximation for the error rate for each focusing position from an error rate of data reproduced on varying the focusing position of the laser light; and finding a focusing position of the laser light corresponding to the least error rate based on the equation of approximation for the error rate for each focusing position of the laser light.

The method for measuring focusing characteristics of an optical pickup and/or an optical disc may further comprise:

finding the quadratic curve equation of approximation of the error rate for each focusing position of the laser light using error rates within a pre-set setting range; and finding the focusing position of the laser light corresponding to the least error rate based on this quadratic curve equation of approximation.

The setting range may be set so as to be not more than an error rate at a focusing position of the laser light enabling focusing servo control and so as to be not less than an error rate occurring without dependency on the focusing position of the laser light and wherein the quadratic curve equation of approximation for each focusing position of the laser light may be found using an error rate within this setting range.

The quadratic curve equation of approximation of the error rate may be found from data of the error rates in the pre-set setting range from the focusing position with the high error rate to the focusing position directly before or in the vicinity of the error rate first exceeding the lower setting range limit.

An offset amount corresponding to the focusing position of the laser light with the least error rate may be imparted to the control amount of focusing servo control for measuring the pre-set characteristic values of the optical pickup and/or the optical disc.

Focusing characteristics of the optical pickup may be adjusted based on the focusing position of the laser light corresponding to the least error rate as found from the equation of approximation of the error rate relative to each focusing position of the laser light.

According to a further aspect of the invention, there is provided an apparatus for recording/reproducing an optical pickup and/or an optical disc comprising:

focusing servo control means for controlling a focal point position of a laser light beam illuminated on the optical disc, based on an output of a photoelectric converting unit of the optical pickup, for focusing the laser light beam on a recording surface of the optical disc;

reproducing means for reproducing data recorded on the optical disc based on an output of the photoelectric converting unit of the optical pickup;

error rate detection means for detecting an error rate of data reproduced by the reproducing means; and adjustment means for imparting a pre-set offset amount to a control amount of the focusing servo control means for varying the focusing position of the laser light beam, getting from the error rate detection means an error rate of reproduced data when the focusing position of the laser light is varied, finding the focusing position of the laser light corresponding to the minimum error rate in accordance with an equation of approximation of the error rate corresponding to each focusing position of the laser light beam and for imparting to a control amount of the focusing servo control means an offset amount corresponding to the focusing position of the laser light with the least error rate.

The adjustment means may find the equation of approximation of a quadratic curve for error rates for respective focusing positions of the laser light using an error rate within a pre-set setting range in order to find the focusing position of the laser light with the least error rate based on this quadratic curve equation of approximation.

The adjustment means may set the pre-set setting range which is not higher than an error rate at a focusing position of the laser light enabling focusing servo control and which is not lower than an error rate which occurs without dependency on the focusing position of the laser light.

The apparatus for recording and/or reproducing an optical pickup and/or an optical disc may further comprise:

an optical pickup for detecting a signal from plural optical discs using plural objective lenses of different characteristics;

said focusing servo control means controlling the focusing position of the laser light illuminated on the optical disc responsive to each optical disc for focusing the laser light on the recording surface of the optical disc.

According to yet a further aspect of the invention, there is provided a method for recording and/or reproducing an optical pickup and/or an optical disc comprising:

controlling the focusing position of the laser light illuminated on the optical disc based on an output of a photoelectric converting unit of the optical pickup for focusing the laser light on the recording surface of the optical disc;

reproducing data recorded on the optical disc based on an output of the photoelectric converting unit of the optical pickup;

detecting an error rate of the reproduced data;

imparting a pre-set offset amount to a control amount of the focusing servo control for varying the focusing position of the laser light;

finding an equation of approximation for the error rate for each focusing position from an error rate of data reproduced on varying the focusing position of the laser light;

finding a focusing position of the laser light with the least error rate based on the equation of approximation for the error rate for each focusing position of the laser light; and imparting to the control amount of focusing servo control an offset amount corresponding to the focusing position of the laser light with the least error rate.

The method for recording and/or reproducing an optical pickup and/or an optical disc may further comprise:

finding a quadratic curve equation of approximation of the error rate for each focusing position of the laser light using error rates within a pre-set setting range; and finding the focusing position of the laser light corresponding to the least error rate based on this quadratic curve equation of approximation.

The setting range may be set so as to be not more than an error rate at a focusing position of the laser light enabling focusing servo control and so as to be not less than an error rate occurring without dependency on the focusing position of the laser light.

The method for recording and/or reproducing an optical pickup and/or an optical disc may further comprise:

detecting signals from plural optical discs of different sorts using plural objective lenses of different characteristics; and controlling the focusing position of the laser light illuminated on the optical disc depending on each optical disc for focusing the laser light on the recording surface of the optical disc.

BRIEF DESCRIPTION OF THE DRAWINGS

In order that the invention might be more fully understood, embodiments of the invention will be described, by way of example only, with reference to the accompanying drawings, in which.

DESCRIPTION OF THE EMBODIMENTS

Figure 1:
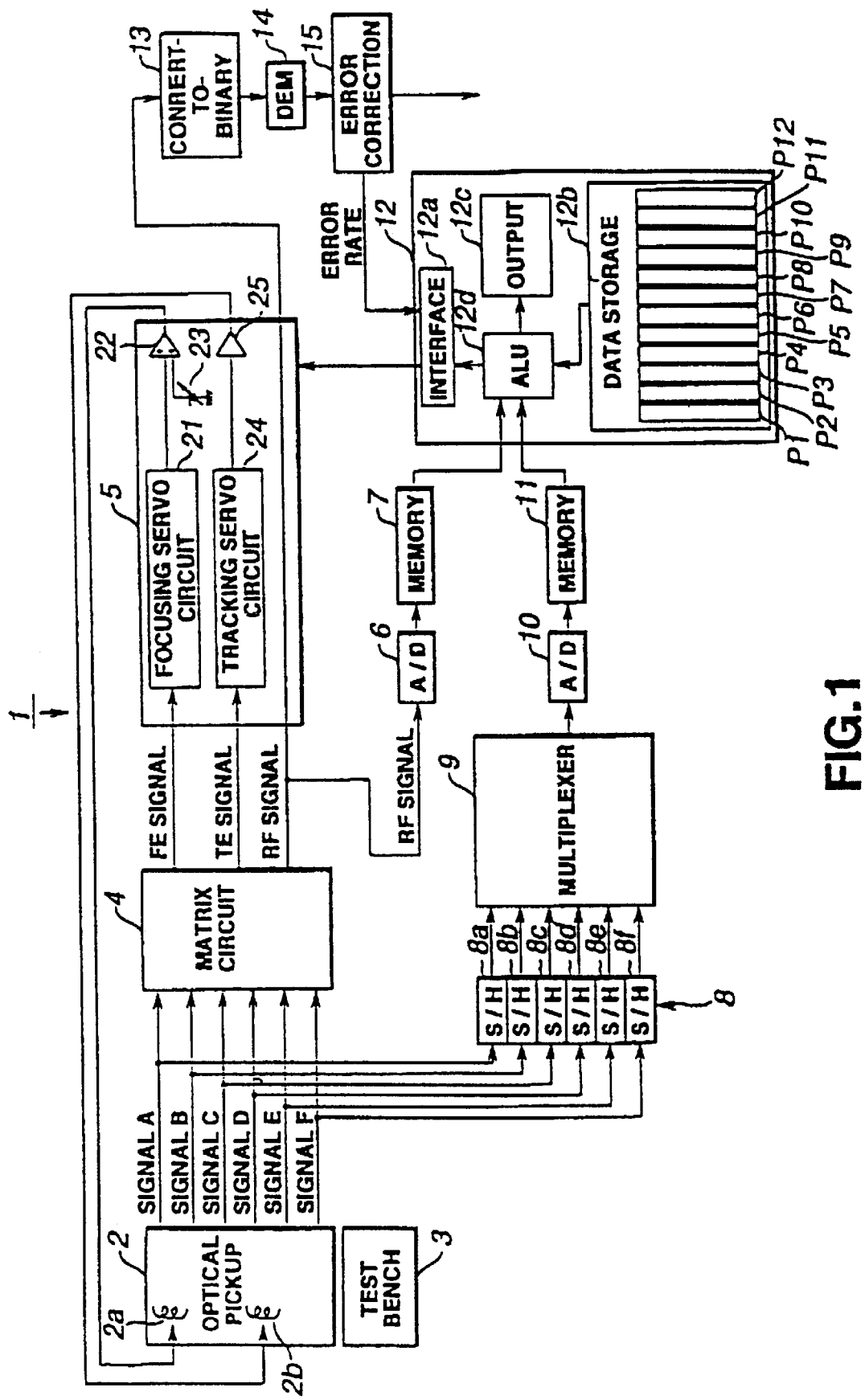
FIG. 1 is a block circuit diagram of a characteristics inspection device of an optical pickup emboding the present invention.

Referring to the drawings, an embodiment of the present invention will be explained in detail.

The device for inspecting characteristics of an optical pickup embodying the present invention, referred to hereinafter as a device for inspecting characteristics or characteristics inspecting device, inspects characteristics of an optical pickup used in an optical disc drive. This sort of the characteristics inspecting device is used for inspecting specifications or characteristics of the optical pickup in, for example, shipment or acceptance tests of the optical pickup.

FIG. 1 shows a block diagram of a device for inspecting characteristics 1 embodying the present invention.

The device for inspecting characteristics 1 is used for inspecting characteristics of an optical pickup 2.

Figure 4:
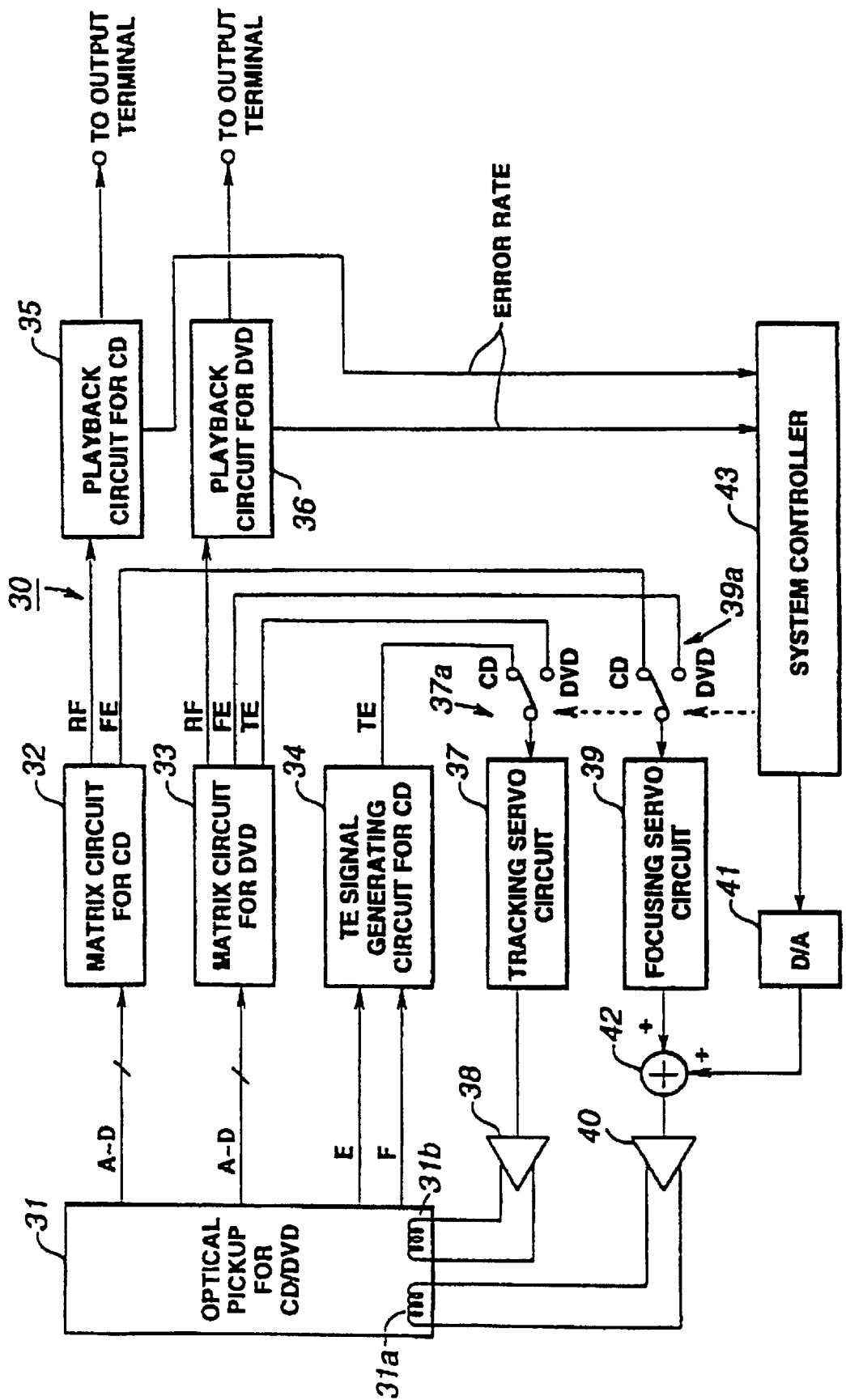
FIG. 4 is a block diagram of an optical disc device embodying the present invention.

The device for inspecting characteristics 1, shown in FIG. 4, includes a test bench 3 on which to set an optical disc, a matrix circuit 4 fed with an output of a photodetector of the optical pickup 2 for outputting a playback (RF) signal and a servo control circuit 5 for performing servo control for reproducing an optical disc based on an output of the matrix circuit 4.

The device for inspecting characteristics 1 also includes a first analog-to-digital converter 6 for converting RF signals of the matrix circuit 4 to digital data and a first memory 7 for transiently storing output data of the first analog-to-digital converter 6.

The device for inspecting characteristics 1 further includes first to sixth sample-and-hold circuits 8a to 8f for sample-holding outputs of the photodetectors of the optical pickup 2, a multiplexer 9 for switching outputs of the first to sixth sample-and-hold circuits 8a to 8f, a second analog-to-digital converter 10 for converting the outputs of the first to sixth sample-and-hold circuits 8a to 8f into digital data and a second memory 11 for transiently storing output data of the second analog-to-digital converter 10.

The device for inspecting characteristics 1 also includes a computer 12 for computing characteristic values of the optical pickup 2 based on the digital data transiently stored in the first memory 7 and in the second memory 11 for displaying the computed results and for controlling the servo control circuit 5 based on the computed results.

The device for inspecting characteristics 1 additionally includes a convert-to-binary circuit 13, a demodulating circuit (DEM) 14 for demodulating resulting binary-valued playback data and an error correction circuit 15 for correcting the demodulated playback data for errors.

The optical pickup 2 is the subject of inspection by this device for inspecting characteristics 1. The optical pickup 2 is detachably mounted on this device for inspecting characteristics 1. The optical pickup 2 includes a laser diode, a beam splitter, an objective lens and a photodetector. This optical pickup 2 condenses a laser light beam outgoing from a laser diode via beam splitter and an objective lens on the optical disc. The optical pickup also forms an image of the reflected light from the optical disc on the photodetector. The photodetector provided on the optical pickup 101 is a photoelectric converting device and converts the imaged reflected light into electrical signals.

Figure 2:
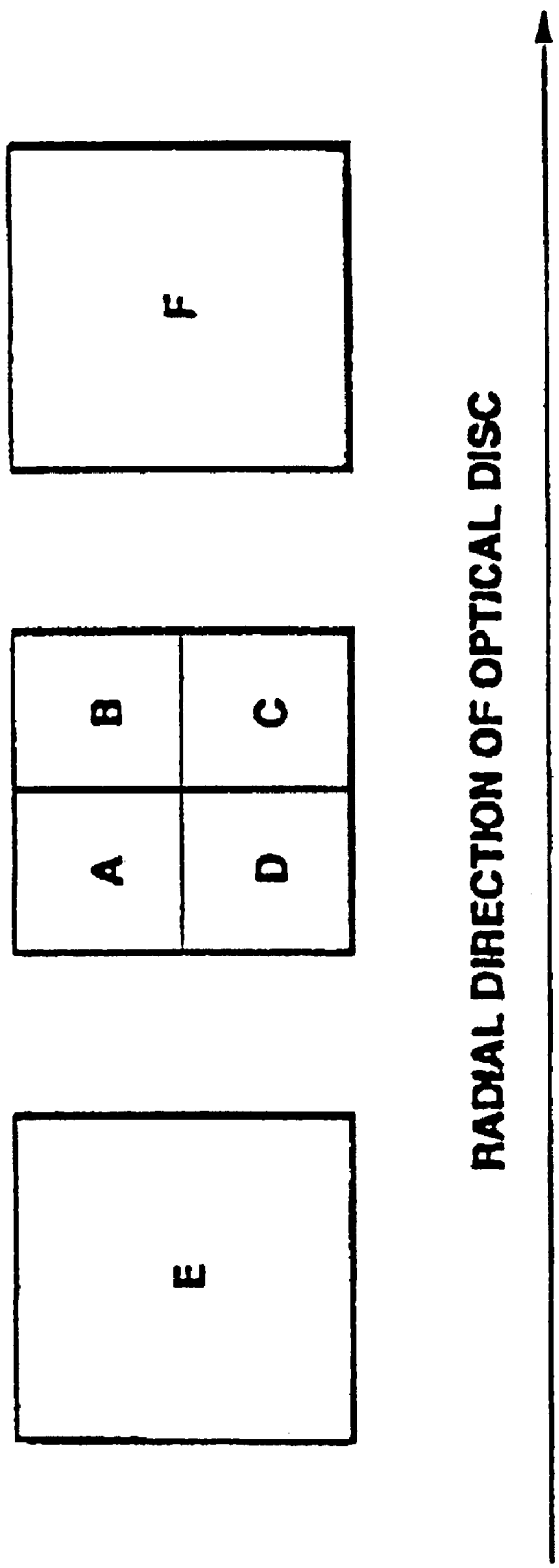
FIG. 2 illustrates an example of a photodetector provided in an optical pickup inspected by the characteristics inspection device of an optical pickup shown in FIG. 1.

The optical pickup 2 includes plural photodetectors. FIG. 2 shows an example of plural photodetectors provided on the optical pickup 6.

The optical pickup 2 includes four photodetectors A to D, arrayed in a 2 2 matrix configuration, and photodetectors E and F arrayed on both sides of the photodetectors A to D forside spot detection, as shown for example in FIG. 6. These photodetectors A to F are used in, for example, in a so-called three-spot optical pickup adapted for radiating three laser light beams to the optical disc. The photodetectors A to D are irradiated with a main beam as a center beam in the three-spot system. That is, the photodetectors A to D are irradiated with reflected light from recording pits recorded on the recording track of the optical disc. The photodetectors E and F are arranged on both sides of the photodetectors A to D in the radial direction of the optical disc. The photodetectors E and F are irradiated with side beams of the three-spot system. For example, the photodetectors E and F are irradiated with light reflected from, for example, the edges of the optical disc track.

The photodetectors A to F convert the light volume of the illuminated reflected light into signals A to F. The optical pickup 2 routes these signals A to F to the matrix circuit 4. The optical pickup 2 sends the signals A to F to the first to sixth sample-and-hold circuits 8a to 8f, respectively.

The test bench 3, on which is set the optical disc, runs the optical disc in rotation for reproducing the disc. The optical disc, set on this test bench 3, is used as a reference for this characteristics inspection device 1. That is, the characteristics inspection device 1 measures characteristics of the optical pickup 2 based on the playback signals of the optical disc used as the reference.

The matrix circuit 4 is fed with signals A to F outputted by the photodetectors A to F of the optical pickup 2 for generating playback (RF) signals, focusing error (FE) signals and tracking error (TE) signals based on these signals A to F. The matrix circuit 4 generates these RF, FE and TE signals based n the signals A to F as follows: That is, the matrix circuit 4 computes A+B+C+D based on the signals A to D to generate RF signals. On the other hand, the matrix circuit 4 computes (A+C)−(B+D) based on the signals A to D to output the computed results as FE signals. That is, the matrix circuit 4 outputs FE signals by the astigmatic method. On the other hand, the matrix circuit 4 computes E-F based on the signals E and F and sends the computed results as TE signals.

The matrix circuit 4 sends the computed RF, FE and TE signals to the servo control circuit 5. Also, the matrix circuit 4 sends the RF signals to the first analog-to-digital converter 6.

The servo control circuit 5 performs servo control for reproducing the optical disc based on the RF, FE and TE signals. Specifically, the servo control circuit 5 drives a biaxial actuator actuating the objective lens of the optical pickup 2, based on the FE signals, so that the FE signals will be zero, for performing focusing servo control. Also, the servo control circuit 5 drives the biaxial actuator actuating the objective lens of the optical pickup 2, based on the TE signals, so that the TE signals will be zero, for performing tracking servo control. The servo control circuit 5 detects dc components of the FE signals to perform thread servo control of the optical pickup 2 so that these dc components will be zero. The servo control circuit 5 also performs tilt servo control for controlling the tilt of the optical disc based on the RF signals. Meanwhile, this servo control circuit 5 may be provided with a separate disc tilt detection unit for performing the tilt servo control.

For performing this servo control, the servo control circuit 5 includes a focusing servo circuit 21, a focusing amplifier 22 for amplifying an output of the focusing servo circuit 21 for supplying the amplified output to a focusing coil 2a of the optical pickup 2, an offset supplying circuit 23 for applying pre-set offset to this focusing amplifier 22, a tracking servo circuit 24, and a tracking amplifier 25 for amplifying an output of the tracking servo circuit 24 for supplying the amplified output to a tracking coil 2b of the optical pickup 2.

The offset supplying circuit 23 is a circuit for applying pre-set offset to the control signal outputted by the focusing servo circuit 21. The offset voltage supplied by this offset supplying circuit 23 is controlled by the arithmetic-logic unit 12d.

Thus, in the present characteristics inspecting device 1, if the pre-set offset voltage is applied for focusing servo control, the focusing position of the laser light radiated from the optical pickup 2 is deviated from the recording surface of the optical disc.

The first analog-to-digital converter 6 converts the RF signals supplied from the matrix circuit 4 into digital data at a high sampling frequency, such as at a sampling frequency of 30 MHz. The first analog-to-digital converter 6 sends the RF signals converted into digital data to the first memory 7.

The first memory 7 transiently stores the RF signals converted into digital data by the first analog-to-digital converter 6.

The sample-and-hold circuits 8a to 8f are fed from the optical pickup 2 with the signals A to F as photodetector output signals. The sample-and-hold circuits 8a to 8f sample-hold the signals A to F simultaneously using the same clocks. The clocks supplied to these sample-and-hold circuits 8a to 8f are at frequencies not lower than, for example, 50 kHz. Thus, the sample-and-hold circuits 8a to 8f repeat the sampling and holding operations with the clock of not less than 50 kHz as one cycle.

The multiplexer 9 switches between outputs of the sample-and-hold circuits 8a to 8f for supplying one of the sample-held outputs to the second analog-to-digital converter 10. The switching speed of the multiplexer 9 is selected to be sufficiently high to supply the sample-held outputs of all of the sample-and-hold circuits 8a to 8f within one clock time to the second analog-to-digital converter 10. This multiplexer 9 operates at a rate not less than six times as high as 50 kHz, if the sample-and-hold circuits 8a to 8f perform sample-holding operations with the clocks of 50 kHz.

The second analog-to-digital converter 10 converts all sample-held outputs of the sample-and-hold circuits 8a to 8f supplied thereto via multiplexer 9 into digital data which is supplied to the second memory 11. This second analog-to-digital converter 10 has a conversion rate sufficient to convert outputs of the sample-and-hold circuits 8a to 8f within one cycle of the clocks supplied to the sample-and-hold circuits 8a to 8f. Since there are six sample-and-hold circuits 8a to 8f, the second analog-to-digital converter 10 achieves the conversion at a conversion rate not less than 300 kHz if the sample-and-hold circuits 8a to 8f repeat the sample-hold operations by 50 kHz clocks.

The sample-and-hold circuits 8a to 8f, multiplexer 9 and the second analog-to-digital converter 10 convert the signals A to F outputted by the photodetectors of the optical pickup 2 independently into digital data. Moreover, the sample-and-hold circuits 8a to 8f, multiplexer 9 and the second analog-to-digital converter 10 convert the signals A to F into digital data at the sampling frequency of, for example, not less than 50 kHz.

In the characteristics inspection device 1, the signals A to F as photodetector output signals of the optical pickup 2 can be converted into digital data by means other than the above-described sample-and-hold circuits 8a to 8f, multiplexer 9 and the second analog-to-digital converter 10. For example, the characteristics inspection device 1 may be comprised of six parallel rows of the analog-to-digital converters each having the sampling frequency of 50 kHz.

The second memory 11 transiently stores the signals A to F of the optical pickup 2 converted into digital data by the second analog-to-digital converter 10.

The computer 12 includes, for example, an interfacing section 12a, a data storage section 12b, an output section 12c and an arithmetic-logic unit 12d. The interfacing section 12a outputs a control signal controlling the servo control circuit 5 to this servo control circuit 5. The data storage section 12b has stored therein processing programs corresponding to measurement items of the optical pickup 2 by the characteristics inspection device 1. The output section 12c displays measured results of the characteristics of the optical pickup 2.

The arithmetic-logic unit 12d of the computer 12 reads out the RF signals converted into the digital data from the first memory 7 for detecting jitter components of the RF signals based on the read-out data. The arithmetic-logic unit 12d of the computer 12 also reads out the signals A to F, converted into digital data, from the second memory 11, and executes arithmetic-logic operations on the measurement items for measuring the characteristics of the optical pickup 2.

In carrying out the processing for the respective measurement items, the arithmetic-logic unit 12d of the computer 12 performs the following arithmetic-logic operations on the data stored in the first memory 7 and the second memory 11. For example, the arithmetic-logic unit 12d performs filtering, peak level calculations, calculations of the waveform period, calculations of the phase difference of two signals, signal extraction by a level window, signal extraction by a periodic window and calculations of the ac and dc signal components.

The error correction circuit 15 corrects errors in data recorded on the optical disc. The error correction circuit 15 detects the number of errors detected by the error detection processing to transmit the result as an error rate via interface 12a to the arithmetic-logic unit 12d.

The items of measurement by the characteristics inspection device 1 are hereinafter explained.

The present characteristics inspection device 1 measures the following items for searching into characteristics of the optical pickup 2:

RF signal level (P1)

$I_{TOP}$ and $I_{BOTTOM}$ of the RF signal (P2)

Jitter of RF signal (P3)

Beam position of the main beam (P4)
TE signal level (P5)
E-F balance (P6)
E-F phase difference (P7)
S-letter level (P8)
S-letter balance (P9)
Defocusing (P10)
Cross-talk (P11)
Astigmatic Aberration (P12)

The processing programs for these items of measurement are stored in the data storage section 12b as processing programs P1 to P12. The arithmetic-logic unit 12d reads out from the data storage unit 12b the processing programs P1 to P12 associated with the measurement items for performing arithmetic-logic operations on the data stored in the first memory 7 or in the second memory 11. In the processing programs P1 to P12, measurement of the above items is carried out using the filtering, peak level calculations, calculations of the waveform period, calculations of the phase difference of two signals, signal extraction by a level window, signal extraction by a periodic window and calculations of the ac and dc signal components as described above.

The processing for measuring the defocusing as described above is now explained.

First, the arithmetic-logic unit 12d of the characteristics inspection device 1 sets the offset voltage outputted by the offset supplying circuit 23 to a pre-set voltage value. The output offset voltage of the offset supplying circuit 23 is supplied to the focusing amplifier 22. Thus, the offset voltage is superimposed on the control signal outputted by the focusing servo circuit 21 so that the focusing position of the laser light radiated on the optical disc is deviated by this offset value from the usual value.

With the focusing position of the laser light thus deviated by this offset value, the characteristics inspection device 1 reproduces the data recorded on the optical disc. That is, the characteristics inspection device 1 processes the RF signals outputted by the matrix circuit 4 with convert-to-binary and demodulation operations.

The characteristics inspection device 1 then performs error correction on playback data processed with the convert-to-binary and demodulation operations. The error correction circuit 15 carries out the error correction while detecting the error rate of the playback data based on the number of error-corrected bits. The error correction circuit 15 furnishes this error rate via interface 12a to the arithmetic-logic unit 12d.

The arithmetic-logic unit 12d of the characteristics inspection device 1 holds on memory the error rate supplied from the error correction circuit 15 in meeting with the offset voltage outputted by the offset supplying circuit 23.

The characteristics inspection device 1 then varies the offset voltage outputted by the offset supplying circuit 23 to vary the focusing position of the laser light radiated on the optical disc for detecting the error rate of the playback data.

The characteristics inspection device 1 repeatedly carries out the above processing for sequentially varying the offset voltage applied to the focusing servo control signal in order to hold the error rate for each focusing position of the laser light on memory. The characteristics inspection device 1 detects the error rate associated with each offset voltage to hold the data on memory. With this characteristics inspection device 1, data such as those shown in FIG. 3 can be obtained as the error rate.

Figure 3:
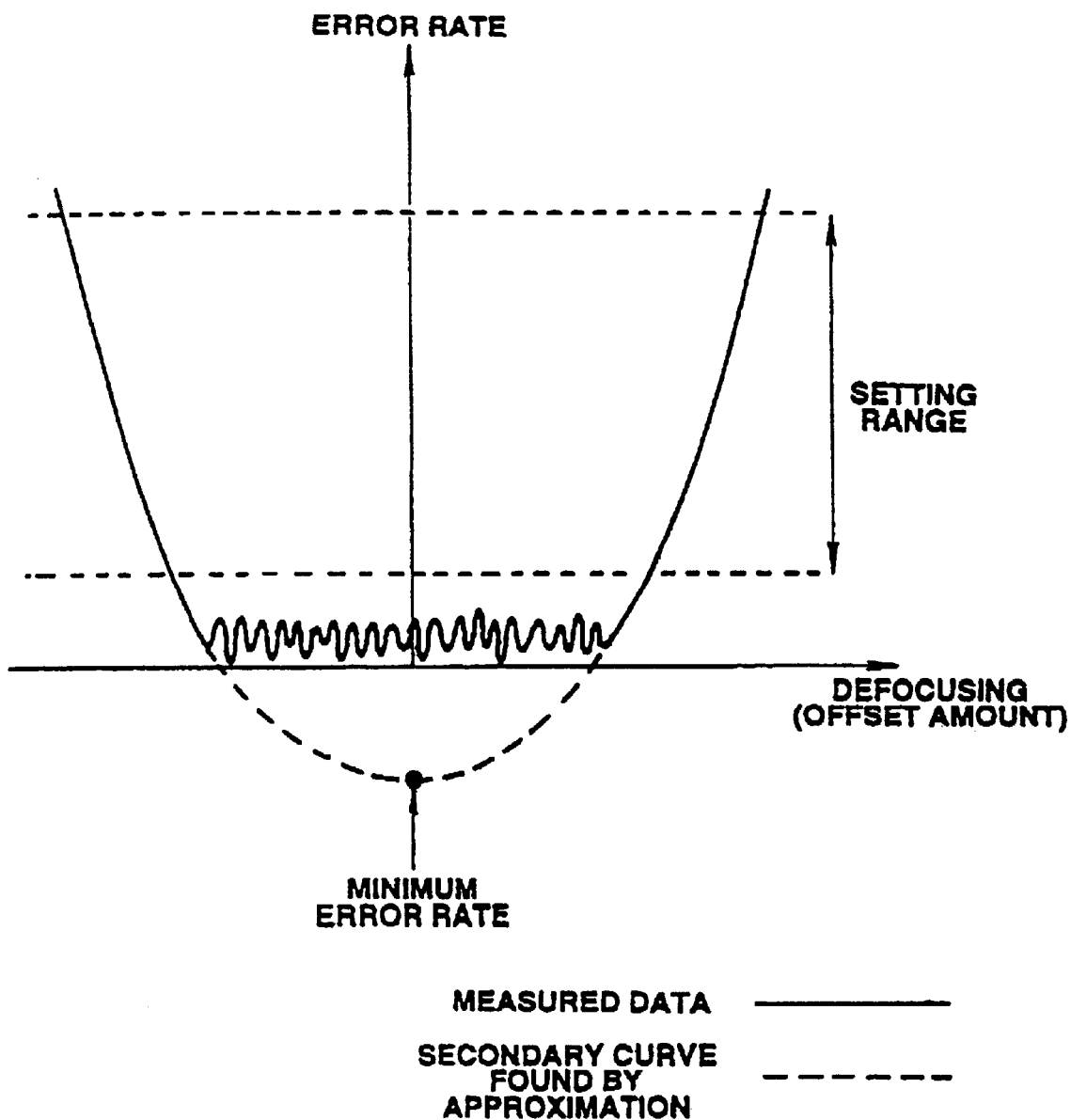
FIG. 3 shows the relation between an error rate and an offset amount as measured by the characteristics inspection device of an optical pickup shown in FIG. 1.

In general, the error rate with respect to the deviation between the focusing position of the laser light and the recording surface, that is the error rate with respect to defocusing, is as shown in FIG. 3.

That is, the error rate becomes progressively smaller as the focal position of the laser light approaches the recording surface, with the focal position of the laser light corresponding to the furthest focal position of the laser light and which permits focusing servo control as an upper limit or terminal end of the focal position. If the error rate comes closer to a pre-set constant rate, the error rate becomes substantially constant without dependency upon the distance between the focusing position of the laser light and the recording surface of the optical disc.

The characteristics inspection device 1 sets, as an allowable range, such a range between an error rate for which the focal position of the laser light is furthest from the recording surface of the optical disc and for which the focusing servo control is possible and an error rate which becomes constant without dependency on the distance between the focusing position of the laser light and the recording surface of the optical disc. The characteristics inspection device 1 takes out the error rate comprised within the setting range to find an equation of approximation of the error rate with respect to the offset amount. For example, the characteristics inspection device 1 approximates the error rate by a quadratic curve, from which to find an amount of offset minimizing the error rate. With the optical pickup 2, the focusing position of the laser light corrected and controlled by this offset amount becomes an optimum focusing position in reproducing data.

If the amount of offset is equal to 0 or within a pre-set range, the characteristics inspection device 1 judges that the optical pickup 2 is in meeting with the specifications and hence gives an affirmative decision (OK). If the amount of offset is not equal to 0 or is not within a pre-set range, the characteristics inspection device 1 judges that the optical pickup 2 is not in meeting with the specifications and hence gives a negative decision (NG).

If the optical pickup 2 is not in meeting with the specifications, the optical pickup 2 is re-adjusted in accordance with prescribed adjustment process for the optical pickup 2 and again the defocusing characteristics thereof are measured to give a decision as to whether or not the optical pickup is in meeting with the specifications.

Thus, the characteristics inspection device 1 can measure the defocusing characteristics of the optical pickup 2 with high accuracy by a simplified circuit.

Although the foregoing description has been made with reference to the characteristics inspection device 1 for measuring the characteristics of the optical pickup 2, the present inspection device 1 can also be applied to inspection of the characteristics of the optical disc. That is, although the optical disc, set on this test bench 3, is used as a reference for the above-described characteristics inspection device 1, it is also possible to measure characteristics of the optical disc by employing the optical pickup as a reference.

In addition, although the optical pickup 2 measured by the characteristics inspection device 1 measures the signals A to F using the photodetector shown in FIG. 2, the present invention is not limited to this optical pickup. For example, embodiments of the present invention are applicable to an optical pickup for a magneto-optical disc or an optical pickup for a phase transition disc. In these cases, the photodetector differs in structure from the photodetectors explained with reference to FIG. 2, so that the numbers of the sample-and-hold circuits 8a to 8f or the second analog-to-digital converters 10 correspond to the number of the photodetectors. On the other hand, if the disc is a magneto-optical disc, the playback signal is a difference signal exploiting the Kerr effect. Therefore, the processing contents of the program in the arithmetic-logic unit 12d need to be matched to this difference signal.

The present characteristics inspection device 1 also can add the amount of offset found during measurement of the focusing characteristics to the focusing servo control amount for measuring other items for measuring characteristics of the optical pickup 2 under an optimum focusing state.

The characteristics inspection device 1 sets the error rate setting range to find an equation of approximation. It is however possible to get data in the setting range beginning from those having a higher error rate and to get data directly before that first exceeding the lower limit of the setting range in order to find the equation of approximation from these data. The purpose of doing this is to reliably remove data in a range of the error rate occurring without dependency on the distance between the focusing position of the laser light and the recording surface of the optical disc because the error rate is varied at random due to measurement noise or other factors even granting that the error rate remains at substantially the constant value without dependency on the distance between the focusing position of the laser light and the recording surface of the optical disc in the vicinity of a pre-set rate as detected by the inspection device 1.

The characteristics inspection device 1 detects the error rate, based on the number of corrected data, using the error correction circuit 15. However, the present invention is not limited to this method of error rate detection. For example, with the present error rate detection method, theoretical data recorded on the optical disc may be previously stored in an internal memory as a data pattern which is then compared to playback data for finding the error rate.

The present invention may also be applied to an optical disc recording and/or reproducing device provided with an offset supplying circuit adapted for adding a pre-set offset to the focusing servo control signals and a controller for finding defocusing characteristics from the error rate of playback data in which measured results of the defocusing characteristics are fed back for recording/reproducing signals under optimum reproducing or recording conditions.

Specifically, an optical disc reproducing device embodying the present invention, referred to hereinafter simply as an optical disc device, is explained with reference to FIG. 4.

The optical disc device 30, shown in FIG. 4, is configured for reproducing a so-called compact disc (CD) or a digital video disc (DVD).

The optical disc device 30 includes an optical pickup 31 used for both the CD and the DVD, a matrix circuit 32 for CD, a matrix circuit 33 for DVD, a tracking error (TE) signal generating circuit for CD 34, a reproducing circuit for CD 35 and a reproducing circuit for DVD 36. The optical disc device 30 also includes a tracking servo circuit 37, a tracking driver 38, a focusing servo circuit 39, a focusing driver 40, a digital-to-analog converter (D/A converter) 41, an addition circuit 42 and a system controller 43.

The optical pickup 31 detects signals recorded on both the CD and the DVD. This optical pickup 31 has two objective lenses of different values of the numerical aperture (NA) which can be switched depending on the type of the loaded optical disc.

The matrix circuit for CD 32 generates playback (RF) signals for CD and focusing error (FE) signals for CD based on an output of photodetectors of the optical pickup 31. The matrix circuit for DVD 33 generates RF signals for DVD, FE signals for DVD and TE signals for DVD based on the photodetector output of the optical pickup 31. The tracking error (TE) signal generating circuit for CD 34 generates the TE signals for CD based on the output of photodetectors of the optical pickup 31.

The reproducing circuit for CD 35 generates data recorded on the CD based on the RF signals generated by the matrix circuit for CD 32. This reproducing circuit for CD 35 includes e.g., a convert-to-binary circuit, a demodulating circuit and an error correction circuit for carrying out the convert-to-binary, demodulation and error correction operations. This reproducing circuit for CD 35 sends reproduced data to other external devices via e.g., an output terminal.

The reproducing circuit for CD 35 detects the number of data corrected by its error correction circuit to find the error rate based on the number of corrected data. The reproducing circuit for CD 35 sends the error rate to the system controller 43.

The reproducing circuit for DVD 36 reproduces data recorded on the DVD based on the RF signals generated by the matrix circuit for DVD 33. This the matrix circuit for DVD 33 includes a convert-to-binary circuit and an error correction circuit, for example, in order to execute convert-to-binary, demodulation and error correction operations. The reproducing circuit for DVD 36 routes the reproduced data via e.g., an output terminal to another external device.

The reproducing circuit for DVD 36 detects the number of data corrected by its error correction circuit to find the error rate based on the number of the corrected data. The reproducing circuit for DVD 36 sends the error rate to the system controller 43.

The tracking servo circuit 37 controls the tracking actuator 31b of the optical pickup 31 via tracking driver 38 based on the tracking error signals supplied from the matrix circuit for DVD 33 or the TE signal generating circuit for CD 34. Upstream of the tracking servo circuit 37 is provided a switch 37a controlled by the system controller 43 for outputting an output of the TE signal generating circuit for DVD 34 to the tracking servo circuit 37 or an output of the matrix circuit for DVD 33 to the tracking servo circuit 37 when the optical disc device 30 reproduces the CD or DVD, respectively.

The tracking servo circuit 37 controls the laser light outgoing from the optical pickup 31 with respect to the optical disc so that the laser light will be in a just-track state with respect to the optical disc.

The tracking servo circuit 39 controls the focusing actuator 31a of the optical pickup 31 via focusing driver 40 based on the focusing error signals supplied from the matrix circuit for CD 32 or the matrix circuit for DVD 33. Upstream of the focusing servo circuit 39 is provided a switch 39a controlled by the system controller 43 for outputting an output of the matrix circuit for CD 32 to the focusing servo circuit 39 or an output of the matrix circuit for DVD 33 to the focusing servo circuit 39 when the optical disc device 30 reproduces the CD or DVD, respectively.

The focusing servo circuit 37 controls the laser light outgoing from the optical pickup 31 with respect to the optical disc so that the laser light will be in a just-track state with respect to the optical disc.

An addition circuit 42 is provided between the focusing servo circuit 39 and the focusing driver 40 for summing a pre-set offset voltage to the control signal outputted by the focusing servo control 39 to route the resulting signal to the focusing driver 40. This offset voltage is supplied from the system controller 43 via the digital-to-analog converter 41.

The system controller 43 finds the offset voltage supplied to the addition circuit 42 based on the error rate of the playback data supplied from the reproducing circuit for CD 35 or from the reproducing circuit for DVD 36 to add an optimum offset voltage to the focusing servo control signal to reproduce the optical disc.

The system controller 43 performs the following processing in order to find the offset voltage:

The optical disc device 30 first sets the offset voltage supplied to the addition circuit 42 to a pre-set voltage value. This impresses a pre-set offset voltage outputted by the focusing servo circuit 39 in the optical disc device 30 to deviate the focusing position of the laser light radiated on the optical disc from the usual value by this offset value.

In this state, the optical disc device 30 reproduces data recorded on the optical disc. That is, in the optical disc device 30, the reproducing circuit for CD 35 or the reproducing circuit for DVD 36 carries out the convert-to-binary, demodulation or error correction. The reproducing circuit for CD 35 or the reproducing circuit for DVD 36 detects the error rate of the reproduced data for supplying the error rate to the system controller 43.

The system controller 43 holds on memory the error rate supplied in meeting with the offset voltage.

The system controller 43 then varies the offset voltage supplied to the addition circuit 42 for varying the focusing position of the laser light illuminated on the optical disc.

The system controller 43 repeats the above processing for sequentially varying the offset voltage applied to the focusing servo control signal for holding on memory the error rate for each focusing position of the laser light.

As described above, the system controller 43 detects the error rate for each offset voltage for holding the detected data on memory.

The system controller 43 then sets as an allowable range such a range defined between an error rate for which the focusing servo control is possible and the focusing position of the laser light is furthest from the recording surface of the optical disc and an error rate for which the focusing position of the laser light becomes substantially constant without dependency upon the distance between the focusing position of the laser light and the recording surface of the optical disc. The system controller 43 takes out an error rate comprised within this setting range to find an equation of approximation corresponding to the offset voltage. For example, the system controller 43 approximates the error rate by a quadratic curve from which the system controller 43 finds an offset voltage corresponding to the minimum error rate.

The system controller 43 furnishes the offset voltage thus found to the addition circuit 42 for reproducing the optical disc.

The optical disc device 30 adds an optimum offset voltage to the focusing servo control signal for reproducing the optical disc at an optimum focusing position.

For example, if two sorts of the optical discs having different values of the numerical aperture of the objective lens are to be reproduced, the optical discs can be adjusted to optimum focusing servo characteristics.

In summary, with embodiments of the measurement device, the error rate of the playback signal when the focusing position of the laser light is detected, and an equation of approximation representing the relation between the focusing position of the laser light and the error rate is found based on this error rate for finding focusing characteristics of the optical pickup and/or the optical disc.

With the embodiments of the measurement device, the measurement means finds a quadratic curve equation of approximation of the error rate with respect to each focusing position of the laser light using an error rate in a pre-set setting range for finding the focusing position of the laser light with the least error rate based on this quadratic curve equation of approximation.

With embodiments of the present measurement device, the relation between the focusing position of the laser light and the error rate is found from the quadratic curve equation of approximation for measuring focusing characteristics of the optical pickup and/or the optical disc.

In summary, with embodiments of the measurement method, the error rate of the playback signal when the focusing position of the laser light is detected, and an equation of approximation representing the relation between the focusing position of the laser light and the error rate is found based on this error rate for finding focusing characteristics of the optical pickup and/or the optical disc.

With embodiments of the present measurement method, the measurement means finds a quadratic curve equation of approximation of the error rate with respect to each focusing position of the laser light using an error rate in a pre-set setting range for finding the focusing position of the laser light with the least error rate based on this quadratic curve equation of approximation.

With embodiments of the present measurement method, the relation between the focusing position of the laser light and the error rate is found from the quadratic curve equation of approximation for measuring focusing characteristics of the optical pickup and/or the optical disc.

In summary, in embodiments of the apparatus for recording and/or reproducing an optical pickup and/or an optical disc, the error rate of reproduced signals when the focusing position of the laser light is varied is detected. An equation of approximation representing the relationship between the focusing position of the laser light and the error rate is found based on this error rate and an offset amount corresponding to the focusing position of the laser light with the least error rate is imparted to the control amount of the focusing servo for recording/reproducing the optical disc at the optimum focusing position.

With embodiments of the present recording and/or reproducing device, the adjustment means finds a quadratic curve equation of approximation for the error rate for each focusing position of the laser light using error rates in a pre-set setting range for finding the focusing position of the laser light with the least error rate based on this quadratic curve equation of approximation.

With embodiments of the present recording and/or reproducing device, the relationship between the focusing position of the laser light and the error rate is found by the quadratic curve equation of approximation for recording and/or reproducing the optical disc at an optimum focusing position.

In summary, in embodiments of the method for recording and/or reproducing an optical pickup and/or an optical disc, the error rate of reproduced signals when the focusing position of the laser light is varied is detected. An equation of approximation representing the relationship between the focusing position of the laser light and the error rate is found based on this error rate and an offset amount corresponding to the focusing position of the laser light with the least error rate is imparted to the control amount of the focusing servo for recording/reproducing the optical disc at the optimum focusing position.

With embodiments of the present recording and/or reproducing device, the adjustment means finds a quadratic curve equation of approximation for the error rate for each focusing position of the laser light using error rates in a pre-set setting range for finding the focusing position of the laser light with the least error rate based on this quadratic curve equation of approximation.

With embodiments of the present recording and/or reproducing device, the relationship between the focusing position of the laser light and the error rate is found by the quadratic curve equation of approximation for recording and/or reproducing the optical disc at an optimum focusing position.

With embodiments of the device and the method for measuring characteristics of the optical pickup and/or the optical disc according to the present invention, the characteristics of the focusing state of the optical pickup and/or the optical disc can be measured with higher accuracy by a simplified circuit.

With embodiments of the device and the method for recording and/or reproducing an optical disc according to the present invention, the characteristics of the focusing state of the optical pickup and/or the optical disc can be measured with higher accuracy by a simplified circuit and an optimum reproduced signal can be obtained based on the measured results.

The embodiments have been advanced by way of example only, and modifications are possible within the spirit and scope of the invention as defined by the appended claims.

What is claimed is:

1. An apparatus for measuring focusing characteristics of an optical pickup and/or an optical disc comprising:

focusing servo control means for controlling a focal point position of a laser light beam illuminated on the optical disc, based on an output of a photoelectric converting unit of the optical pickup, for focusing the laser light beam on a recording surface of the optical disc;

reproducing means for reproducing data recorded on the optical disc based on an output of the photoelectric converting unit of the optical pickup;

error rate detection means for detecting an error rate of data reproduced by said reproducing means; and measurement means for imparting a pre-set offset amount to a control amount of said focusing servo control means for varying the focusing position of the laser light, getting from said error rate detection means an error rate of reproduced data when the focusing position of the laser light is varied and for finding the focusing position of the laser light corresponding to the minimum error rate in accordance with an equation of approximation of the error rate corresponding to each focusing position of the laser light.

2. The apparatus for measuring focusing characteristics of an optical pickup and/or an optical disc as claimed in claim 1 wherein said measurement means finds the equation of approximation of a quadratic curve for error rates for respective focusing positions of the laser light using an error rate within a pre-set setting range in order to find the focusing position of the laser light corresponding to the least error rate based on this quadratic curve equation of approximation.

3. The apparatus for measuring focusing characteristics of an optical pickup and/or an optical disc as claimed in claim 2 wherein said measurement means sets said pre-set setting range which is not higher than an error rate at a focusing position of the laser light enabling focusing servo control and which is not less than an error rate which occurs without dependency on the focusing position of the laser light.

4. The apparatus for measuring focusing characteristics of an optical pickup and/or an optical disc as claimed in claim 2 wherein said measurement means finds the quadratic curve equation of approximation of the error rate from data of the error rates in said pre-set setting range from the focusing position with the high error rate to the focusing position directly before or in the vicinity of the error rate first exceeding the lower setting range limit.

5. The apparatus for measuring focusing characteristics of an optical pickup and/or an optical disc as claimed in claim 1 wherein said measurement means imparts an offset amount corresponding to the focusing position of the laser light with the least error rate to the control amount of the focusing servo control means for measuring the pre-set characteristic values of the optical pickup and/or the optical disc.

6. The apparatus for measuring focusing characteristics of an optical pickup and/or an optical disc as claimed in claim 1 further comprising:

adjustment means for adjusting focusing characteristics of the optical pickup based on the focusing position of the laser light corresponding to the least error rate.

7. A method for measuring focusing characteristics of an optical pickup and/or an optical disc comprising:

controlling the focusing position of the laser light illuminated on the optical disc based on an output of a photoelectric converting unit of the optical pickup for focusing the laser light on the recording surface of the optical disc;

reproducing data recorded on the optical disc based on an output of the photoelectric converting unit of the optical pickup;

detecting an error rate of the reproduced data;

imparting a pre-set offset amount to a control amount of the focusing servo control for varying the focusing position of the laser light;

finding an equation of approximation for the error rate for each focusing position from an error rate of data reproduced on varying the focusing position of the laser light; and finding a focusing position of the laser light corresponding to the least error rate based on the equation of approximation for the error rate for each focusing position of the laser light.

8. The method for measuring focusing characteristics of an optical pickup and/or an optical disc as claimed in claim 7 further comprising:

finding the quadratic curve equation of approximation of the error rate for each focusing position of the laser light using error rates within a pre-set setting range; and finding the focusing position of the laser light corresponding to the least error rate based on this quadratic curve equation of approximation.

9. The method for measuring focusing characteristics of an optical pickup and/or an optical disc as claimed in claim 8 wherein the setting range is set so as to be not more than an error rate at a focusing position of the laser light enabling focusing servo control and so as to be not less than an error rate occurring without dependency on the focusing position of the laser light and wherein the quadratic curve equation of approximation for each focusing position of the laser light is found using an error rate within this setting range.

10. The method for measuring focusing characteristics of an optical pickup and/or an optical disc as claimed in claim 8 wherein the quadratic curve equation of approximation of the error rate is found from data of the error rates in said pre-set setting range from the focusing position with the high error rate to the focusing position directly before or in the vicinity of the error rate first exceeding the lower setting range limit.

11. The method for measuring focusing characteristics of an optical pickup and/or an optical disc as claimed in claim 7 wherein an offset amount corresponding to the focusing position of the laser light with the least error rate is imparted to the control amount of focusing servo control for measuring the pre-set characteristic values of the optical pickup and/or the optical disc.

12. The method for measuring focusing characteristics of an optical pickup and/or an optical disc as claimed in claim 7 wherein focusing characteristics of the optical pickup are adjusted based on the focusing position of the laser light corresponding to the least error rate as found from the equation of approximation of the error rate relative to each focusing position of the laser light.

13. An apparatus for recording/reproducing an optical pickup and/or an optical disc comprising:

focusing servo control means for controlling a focal point position of a laser light beam illuminated on the optical disc, based on an output of a photoelectric converting unit of the optical pickup, for focusing the laser light beam on a recording surface of the optical disc;

reproducing means for reproducing data recorded on the optical disc based on an output of the photoelectric converting unit of the optical pickup;

error rate detection means for detecting an error rate of data reproduced by said reproducing means; and adjustment means for imparting a pre-set offset amount to a control amount of said focusing servo control means for varying the focusing position of the laser light beam, getting from said error rate detection means an error rate of reproduced data when the focusing position of the laser light is varied, finding the focusing position of the laser light corresponding to the minimum error rate in accordance with an equation of approximation of the error rate corresponding to each focusing position of the laser light beam and for imparting to a control amount of the focusing servo control means an offset amount corresponding to the focusing position of the laser light with the least error rate.

14. The apparatus for recording and/or reproducing an optical pickup and/or an optical disc as claimed in claim 13 wherein said adjustment means finds the equation of approximation of a quadratic curve for error rates for respective focusing positions of the laser light using an error rate within a pre-set setting range in order to find the focusing position of the laser light with the least error rate based on this quadratic curve equation of approximation.

15. The apparatus for recording and/or reproducing an optical pickup and/or an optical disc as claimed in claim 14 wherein said adjustment means sets said pre-set setting range which is not higher than an error rate at a focusing position of the laser light enabling focusing servo control and which is not lower than an error rate which occurs without dependency on the focusing position of the laser light.

16. The apparatus for recording and/or reproducing an optical pickup and/or an optical disc as claimed in claim 13 further comprising:

an optical pickup for detecting a signal from plural optical discs using plural objective lenses of different characteristics;

said focusing servo control means controlling the focusing position of the laser light illuminated on the optical disc responsive to each optical disc for focusing the laser light on the recording surface of the optical disc.

17. A method for recording and/or reproducing an optical pickup and/or an optical disc comprising:

controlling the focusing position of the laser light illuminated on the optical disc based on an output of a photoelectric converting unit of the optical pickup for focusing the laser light on the recording surface of the optical disc;

reproducing data recorded on the optical disc based on an output of the photoelectric converting unit of the optical pickup;

detecting an error rate of the reproduced data;

imparting a pre-set offset amount to a control amount of the focusing servo control for varying the focusing position of the laser light;

finding an equation of approximation for the error rate for each focusing position from an error rate of data reproduced on varying the focusing position of the laser light;

finding a focusing position of the laser light with the least error rate based on the equation of approximation for the error rate for each focusing position of the laser light; and imparting to the control amount of focusing servo control an offset amount corresponding to the focusing position of the laser light with the least error rate.

18. The method for recording and/or reproducing an optical pickup and/or an optical disc as claimed in claim 17 further comprising: finding a quadratic curve equation of approximation of the error rate for each focusing position of the laser light using error rates within a pre-set setting range; and finding the focusing position of the laser light corresponding to the least error rate based on this quadratic curve equation of approximation.

19. The method for recording and/or reproducing an optical pickup and/or an optical disc as claimed in claim 18 wherein the setting range is set so as to be not more than an error rate at a focusing position of the laser light enabling focusing servo control and so as to be not less than an error rate occurring without dependency on the focusing position of the laser light.

20. The method for recording and/or reproducing an optical pickup and/or an optical disc as claimed in claim 17 further comprising:

detecting signals from plural optical discs of different sorts using plural objective lenses of different characteristics; and controlling the focusing position of the laser light illuminated on the optical disc depending on each optical disc for focusing the laser light on the recording surface of the optical disc.

* * * * *